July 17, 1962

P. F. SHIVERS 3,044,295

CONTROL DEVICE

Filed Jan. 20, 1958

INVENTOR.
Paul F. Shivers.
BY
ATTORNEY.

July 17, 1962  P. F. SHIVERS  3,044,295
CONTROL DEVICE

Filed Jan. 20, 1958  2 Sheets-Sheet 2

INVENTOR.
Paul F. Shivers.
BY
ATTORNEY.

United States Patent Office 3,044,295
Patented July 17, 1962

3,044,295
CONTROL DEVICE
Paul Franklin Shivers, Minneapolis, Minn., assignor to Robertshaw-Fulton Controls Company, Richmond, Va., a corporation of Delaware
Filed Jan. 20, 1958, Ser. No. 710,047
7 Claims. (Cl. 73—339)

This invention relates in general to control devices for controlling the flow of a medium in response to a condition and in particular, to thermostatically actuated control devices for controlling an air flow in response to the temperature thereof.

In some air conditioning systems, it is customary to heat or cool air and then to circulate the air to a space being conditioned. This invention relates to an automatic control device which will respond to the temperature condition of the air being heated or cooled to control a fan or other device which circulates the air.

Since a large range of temperatures are required to accommodate various air conditioning systems, an automatic control device of this character to be truly versatile and effective must be capable of being varied to respond to different operating temperatures throughout a broad range. Also, since some spaces undergo relatively rapid temperature changes, it is conceivable that the fan or other device circulating the air will be caused to operate incessantly for short intervals causing undue wear on the equipment. To eliminate this undue wear, the automatic control device should also be capable of being adjusted to vary the operating temperature differential range within which the automatic control device will operate.

It is, therefore, an object of this invention to vary the operating temperature and the operating temperature differential range of an automatic control device in an effective and simplified manner.

Another object of this invention is to vary operating temperature and operating temperature differential range of an automatic control device by varying the lever ratio and motion transmitting ratio of a lever mechanism associated therewith.

It is a further object of this invention to vary the operating temperature and the operating temperature differential range of an automatic control device by varying a single adjusting means.

Another object of this invention is to vary the operating temperature differential range of an automatic control device without effecting the calibration of the device.

This invention comprises control means, thermally responsive means, and disposed therebetween, motion transmitting means in the form of cooperating levers held in spaced relationship by an adjusting member. The motion transmitting means are operable by movement of the thermally responsive means in response to temperature variations to move the control means between control positions. The adjusting member is operable by a manually operable means associated therewith to vary the spacing between the pair of cooperating levers to vary the operating temperature to which the control means will be responsive. Additional manually operable means are associated with the adjusting member and are operable thereon to vary the lever ratio of said pair of cooperating levers to thereby vary the operating temperature differential range within which the control means will be responsive.

Additional features and advantages will become apparent from the following description of an embodiment of the invention taken in connection with the accompanying drawings wherein.

Figures 1, 3:
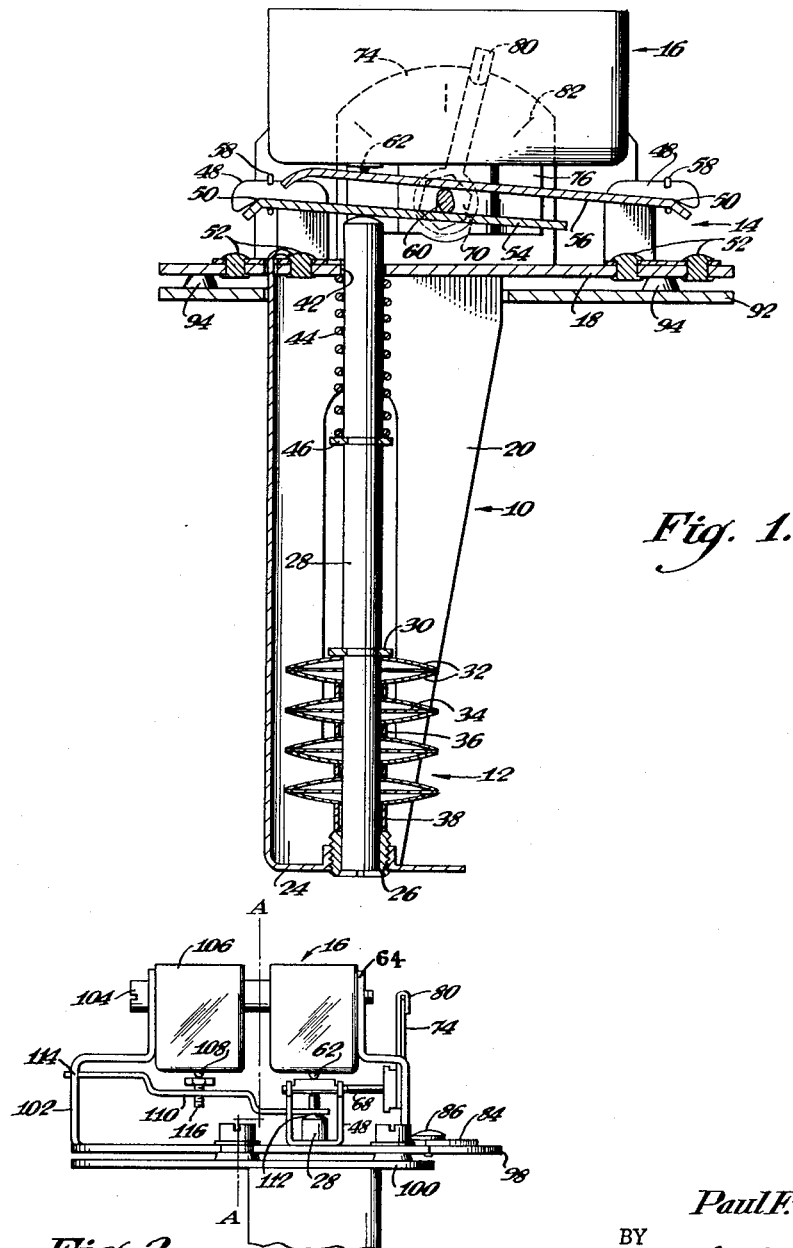
FIG. 1 is a rear elevation view of a control device embodying the present invention with certain parts shown in section.
FIG. 3 is a partial end elevation view of a control device with top limit control embodying the present invention.
Figure 2:
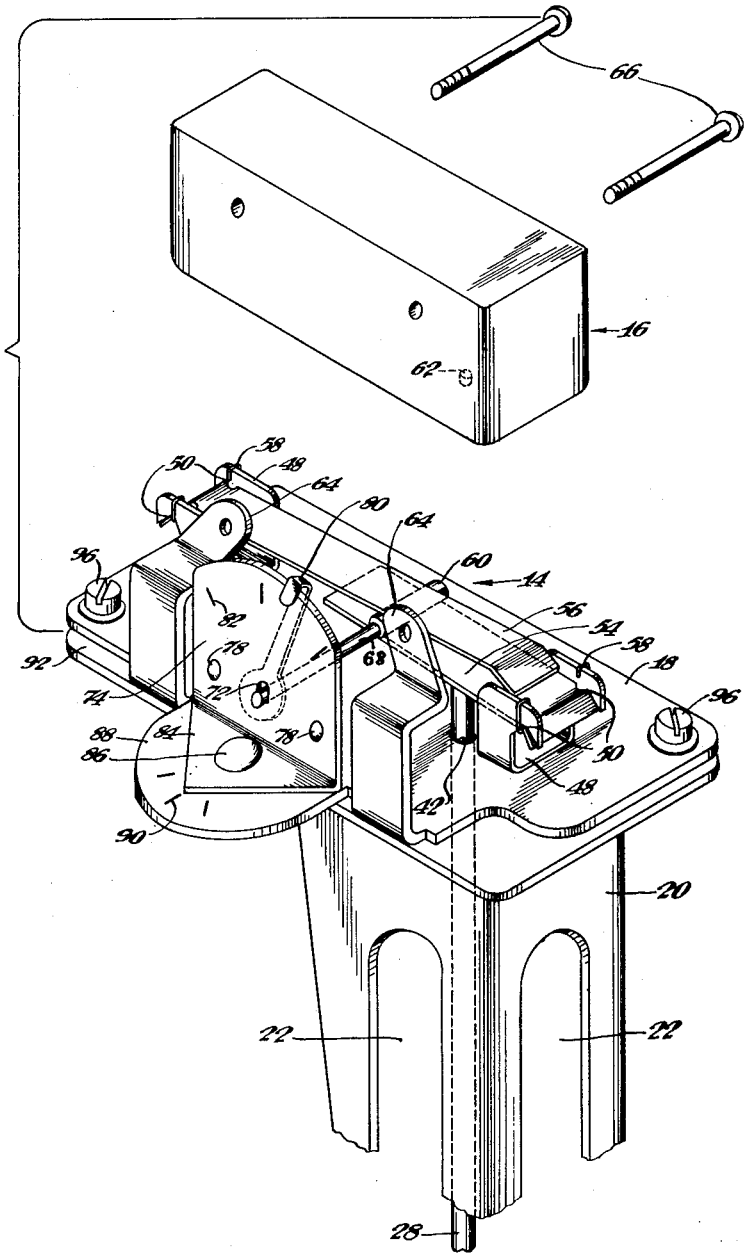
FIG. 2 is a front perspective view partially exploded showing the motion transmitting means and adjusting means therefor of a control device embodying the present invention.

Referring more particularly to FIGS. 1 and 2, the control device comprises a support member 10 and mounted thereon an actuator or thermally responsive means indicated generally at 12, a motion transmitting means indicated generally at 14, and a control means indicated generally at 16.

Support member 10 comprises a substantially rectangular base plate 18 and integrated therewith by any suitable means and disposed at right angles thereto is a member 20 which may be of any suitable form, such as a metal channel, formed with slots 22 in the surfaces thereof for a purpose to be hereinafter described and with an end portion 24. An externally threaded sleeve member 26 is threadedly adjustable in a suitable opening in end portion 24.

The actuator or thermally responsive means 12 in the present invention includes a shaft member 28 shown with one end disposed in the sleeve member 26 for sliding movement therein. A member 30, which can be in the form of a split-snap ring, is rigidly secured to shaft member 28 near the end thereof which is disposed in sleeve 26. Located on the shaft 28 intermediate the member 30 and the sleeve member 26 is a bimetal stack, shown as a plurality of convex bimetal disc elements 32. The disc elements 32 are arranged in cooperable pairs with their concave surfaces facing toward one another and having interposed therebetween a washer element 34 which provides a bearing surface for the disc elements 32 and insures maximum deflection thereof. Sleeve members 36, which have a sliding fit on the shaft 28, serve to space each pair of disc elements 32 apart. It will be noted that the uppermost disc element 32 of the bimetal stack abuts the split-snap ring 30 whereas the bottom disc element 32 abuts one end of a sleeve member 38. The other end of sleeve member 38 in turn abuts the threaded sleeve member 26.

The other end of shaft 28 protrudes through a suitable aperture 42 which is bored in the base plate 18 in axial alignment with sleeve member 26. A spring 44 is located about shaft 28 in compression between the underside of base plate 18 and a member 46 which may be in the form of a split-snap ring rigidly secured to shaft 28. The spring 44 biases the shaft 28 for movement in a downward direction to keep the parts of the bimetal stack snugly against each other between members 26 and 30.

In the operation of the control device as thus far described, the bimetal disc elements 32 will assume some particular convex shape depending upon the temperature to which they are subjected. Being thus convex in shape and having their extreme circumferential portions bearing against opposite surfaces of the washer member 34, they occupy more area along the length of shaft 28 between members 26 and 30 than they would normally occupy in a flattened condition. The disc elements 32 will respond to temperature changes in a manner which is dependent upon whether the active metal portion is on the concave or convex surface thereof. For purposes of illustration, the active metal will be considered to be on the concave surface of disc elements 32 so that a rise in temperature will cause the discs 32 to flatten out.

As the disc elements 32 assume a flattened position in response to a rise in temperature, they will occupy less area along the length of shaft 28 and thus the height of the bimetal stack between members 26 and 30 will decrease and spring 44 will cause the shaft 28 to move downwardly to maintain the parts of the bimetal stack in a snug relationship.

A fall in temperature, on the other hand, will cause the bimetal elements 32 to assume a more convex shape to thus occupy more area along the length of shaft 28 between members 26 and 30. Thus, a force is exerted on member 30 to cause movement of the shaft 28 upwardly against the bias of spring 44.

The motion transmitting means 14 of the present invention includes a pair of pivot members 48, which are integrated with the surface of plate 18 in an opposed aligned relationship by any suitable means, such as rivets 52. Each pivot member 48 has a pair of V-shaped bearing members in the form of notches 50 preferably indented as an integral part thereof. A pair of cooperable lever members 54, 56 are pivoted on the V-shaped bearing notches 50 and are supported thereon by means of retaining members 58 which may be in the form of bent metal clips. Lever member 54 is disposed in a manner to have a medial portion of the bottom surface thereof engaged by the end of shaft 28 protruding upwardly through aperture 42 for motion therewith about its pivot point.

Resting upon a medial portion of the top surface of lever 54, is an eccentric cam member 60 which is movable vertically by lever 54. Lever 56 is disposed in a position to overlie lever 54 with a medial portion of its bottom surface resting upon the cam member 60. Upon vertical movement of cam member 60, lever 56 will be moved upward about its pivot point to engage its free end with an operator 62 of the control means 16. It is thus evident that any movement of shaft 28 will be transmitted through lever 54, cam member 60, and lever 56 to move operator 62 of control means 16.

As best illustrated in FIG. 2, the control means 16 is shown adapted to be secured to two upstanding support members 64 made integral with base plate 18 by means of bolts 66. The control means 16 may be of any suitable form, such as an electrical switch with the operator 62 biased for movement in a direction outward of the control means 16 by means (not shown) internal thereto. The control means 16 for purposes of illustration will be operable between active and inactive control positions and will be operated to its active control position when operator 62 is moved in a direction outward thereof.

The cam member 60 is made as an integral end portion of a horizontally disposed adjusting member 68 which has an adjusting nut 70 located near the other end thereof. Since vertical movement of cam member 60 by lever 54 will also cause vertical movement of the member 68, the end portion of adjusting member 68 near which adjusting nut 70 is located is disposed in a vertically elongated opening 72 provided in an upstanding portion of an L-shaped bracket member 74.

A suitable plate member 76, shown in FIG. 1, having an opening corresponding in dimensions to those of the elongated opening 72, is fastened to the rear side of the upstanding portion of bracket 74 by means of rivets 78 (FIG. 2). The adjusting nut 70 is held between plate 76 and the upstanding portion of bracket 74 in a manner to locate member 68 in opening 72 and the corresponding opening in member 76 to thus prevent any substantial axial movement of adjusting member 68.

One end of a lever member 80 is integrated with adjusting nut 70 and the other end thereof is in the form of a hook turned over the top edge of the upstanding portion of bracket 74. Lever 80 is manually operable in an arcuate path to cause rotation of the cam member 60 between the levers 54 and 56 to thereby vary the spacing between these levers and to thus vary the operating temperature of the control device. A plurality of markings 82 are provided near the top edge of the upstanding portion of bracket 74 and may be in terms of degrees Fahrenheit or some other parameter which may be controlled by this device.

A horizontally disposed portion of bracket member 74 is in the form of a pointer 84 and is secured as by means of a rivet 86 to a semi-circular extension 88 which is formed as an integral part of base plate 18. Bracket 74 is pivoted about rivet 86 and may be moved manually to cause horizontal movement of cam member 60 between levers 54 and 56 transverse of their length to thereby change the lever ratio of motion transmitting means 14 and the operating temperature differential range of the control device. The pointer 84 can be moved to any one of a plurality of markings 90 provided on extension 88 which may be in terms of degrees Fahrenheit or some other parameter which may be controlled by this control device.

A mounting plate 92, made with threaded bosses 94 as an integral part thereof and with a suitable opening to receive the channel member 20, is secured to the underside of base plate 18 as by machine screws 96 fastened in bosses 94.

To initially calibrate this control device to operate control means 16 to its active control position at some particular temperature, the pointer 84, as viewed in FIG. 2, is moved to the extreme left hand marking 90 and the hooked portion of lever 80, as viewed in FIG. 2, is moved to the extreme left hand marking 82. With pointer 84 and lever 80 thus set, the cam member 60 has been rotated to a position to provide maximum spacing between levers 54 and 56 and is positioned directly above shaft 28 and directly beneath operator 62. With the cam member 60 thus positioned, any movement of shaft 28 will be transmitted through the motion transmitting means 14 directly to operator 62.

With disc elements 32 subjected to the temperature at which calibration is desired, sleeve element 26 should be rotated in a direction to operate the control means 16 to its active control position. It should be evident that rotation of sleeve member 26 in one direction will cause upward movement of shaft 28 whereas rotation of sleeve member 26 in the other direction will cause downward movement of shaft 28 without affecting the height of the bimetal stack between members 26 and 30.

In the operation of this control device, assume for example that the hooked portion of lever 80 and the pointer 84 are set as previously indicated to calibrate this control device. Assume now also that the control device is mounted on an air conditioning duct in a manner to locate the thermally responsive means 12 on the interior of the duct and that the duct is carrying a heating medium, the temperature of which is below the temperature at which the control means 16 will be operated to its active control position. With the thermally responsive means 12 thus located within the duct, the air therein will flow through openings 22 provided in channel member 20 and over and around the disc elements 32. As the temperature of the heating medium rises, the disc elements 32 rise in temperature accordingly and proceed to assume a flattened condition, thereby allowing shaft member 28 to move downwardly under the bias of spring 44. As shaft 28 moves downwardly, lever 54 is caused to rotate downwardly about its pivot point, cam member 60 moves vertically downward, and lever 56 also rotates downwardly about its pivot point. Operator 62 is allowed to move outwardly of control means 16 and the control means 16 is operated to its active control position when the temperature value of the heating medium reaches the value to which the lever 80 has been adjusted.

The operating temperature of the control device can be varied by means of lever 80. As has been previously noted, when lever 80 (FIG. 2) is positioned at the extreme left hand marking 82, the cam member 60 is rotated to a position to provide maximum spacing between levers 54 and 56. With this setting, it should be evident that for a given condition of the disc elements 32, the free end of lever 56 will be at its greatest elevated position. Movement of lever 80 to the right will cause cam member 60 to rotate in a manner to decrease the spacing between levers 54 and 56 to thus lower the elevated position of the free end of lever 56. Cam member 60 will be in a position to provide for minimum spacing between levers 54 and 56 when lever 80 is set at the extreme right hand marking 82 and the free end of lever 56 will be at its least elevated position.

Since operator 62 operates control means 16 to its active control position when it is allowed to move outwardly of the control means 16, the position of the free end of lever 56 with respect to operator 62 as adjusted by cam member 60 will vary the temperature at which control means 16 will be responsive. The maximum spacing between levers 54 and 56 determines the maximum temperature at which the control means 16 will be operated to its active control position and a decrease in spacing between levers 54 and 56 will decrease the temperature at which control means 16 will be operated to its active control position.

The operation of the control means 16 to the active position may be arranged to operate a fan (not shown) located in a heating duct to cause movement of the heating medium in the duct and to thus cause the temperature of the heating medium passing over the disc elements 32 to eventually drop. This drop in temperature will have the effect of causing the disc elements 32 to assume a more convex position and to cause upward movement of shaft 28 and eventual operation of the control means 16 to the inactive position due to the upward rotation of lever member 56.

Should the fan be operated incessantly for short intervals due to rapid temperature changes in the air duct, the pointer 84 of bracket 74 can be moved to another position to effect an increased operating differential in the motion transmitting means 14. As pointer 84 is moved, the bracket 74 is caused to pivot about rivet 86 in a manner to cause cam member 60 to move longitudinally of the length of levers 54 and 56. As previously noted, cam member 60 was positioned above shaft 28 and beneath the operator 62 when the pointer 84 was set at the extreme left hand marking 90 (FIG. 2). When cam member 60 is thus set, the operating differential of the motion transmitting means 14 is at a maximum. Upon movement of pointer 84 to the right (FIG. 2), cam member 60 is caused to move to the left between the levers 54 and 56 and thus the operating differential range of the motion transmitting means 14 is decreased. This operation can best be explained by referring to FIG. 1.

For a given movement of shaft 28, the lever 54 will be caused to move in a corresponding direction about its pivot point. Since lever 54 is pivoted about one end, the greatest vertical movement thereof will be at its free end. With cam member 60 located directly above the shaft 28, the vertical movement imparted thereto by lever 54 will be identical in length to that of the movement of shaft 28. However, when cam member 60 is moved to the right, the vertical movement imparted thereto will become progressively greater until a maximum movement is reached as it approaches the free end of lever 54.

Any vertical movement of the cam member 60 results in movement of lever 56. When cam member 60 is located directly above shaft 28, the resultant movement of lever 56 will correspond in length to the movement of shaft 28. As cam member 60 is moved to the right, its length of vertical movement increases due to the lever action of lever 54 and as the length of vertical movement of cam member 60 is increased, it is applied to points on lever member 56 progressively closer to its pivot point. Due to the lever action of lever 56, a larger movement applied near its pivot point will result in a correspondingly larger movement of its free end. Thus, as cam member 60 is moved to the right, the lever ratio of the motion transmitting means 14 is caused to increase and the effect thereof is that the free end of lever 56 will move through an ever increasing length of movement for a given movement of shaft 28.

The operating differential of the motion transmitting means 14 is thus decreased to a minimum value when cam member 60 is located to the extreme left, as shown in FIG. 1, by movement of pointer 84 to the extreme right hand marking 90, as shown in FIG. 2. At this setting, the disc elements 32 must experience only a slight change in their convex shape due to a slight change in temperature to provide sufficient movement of the free end of lever 56 to operate control means 16 between the active and inactive positions.

It is important to note that as cam member 60 is moved horizontally by bracket 74, the position of cam member 60 as set by lever 80 does not vary. Thus, by the simple adjustment of lever 80 and bracket 74, this control device may be adjusted to operate at a plurality of operating temperatures and the temperature differential range may be varied at any of these plurality of operating temperatures without effecting the operating temperature as set by lever 80.

When the control device is used in a heating duct such as the one referred to above and if, for example, the fan operated by control means 16 should become inoperative, the fan would not operate to reduce the temperature in the heating duct and damage could result to the fan, the control device, or other apparatus or equipment located in or on the duct if the temperature should become abnormally excessive. In a situation of this nature, it would be desirable to turn off the heating plant or sound an alarm. In FIG. 3, there is shown a modification of this control device with top limit control which could perform such a function.

In this modification (FIG. 3), the parts to the right of line A—A are identical to those described above with respect to FIGS. 1 and 2 with the exception of shaft 28, base plate 98, and the mounting plate 100.

Base plate 98 is modified to be larger in size and have additional mounting brackets 102. Mounting plate 100 is also enlarged to correspond more nearly in dimensions to that of base plate 98. Secured to bracket 102, as by means of bolts 104 which also secure control means 16 to brackets 64, is a control means 106 which may be identical to control means 16 and have an operator 108.

The end of shaft 28 has been modified to support one end of an operating lever 110. This modification may be accomplished as shown in FIG. 3 by reducing the diameter of a portion of the length of shaft 28 extending above base plate 98 to provide a surface 112 on which the one end of operating lever 110 will bear.

The other end of lever 110 is pivoted at 114 in a suitable opening provided in bracket 102. Located intermediate the length of lever 110 in an operative relation to operator 108 is an adjustable member 116 which can be threadedly adjusted in lever 110, to adjust the point at which control means 106 will be operated to its active position.

In the operation of the control device as thus modified, the operation of the parts to the right of the line A—A will be identical to that heretofore described with respect to FIGS. 1 and 2. As shaft 28 is caused to move upwardly due to a fall in temperature, the operating lever 110 will move upwardly about its pivot at 114 and when shaft 28 is caused to move downwardly by a rise in temperature, operting lever 110 will move downwardly about its pivot 114. With operation of control means 106 identical to that of control means 16, operator 108 must be allowed to move outwardly of control means 106 to operate same to the active position. Member 116 can be adjusted to a particular excessive temperature at which it is desirable to operate control means 106 to the active position and when operator 108 is allowed to move outwardly of control means 106 by movement of shaft 28 in that direction, control means 106 will be operated to the active position to sound an alarm or perform some other function.

From the foregoing, it will be seen that a simple and compact control device is provided in which few and simple parts and elements are so arranged as to provide simple operating functions coupled with ease of adjustment and assembly.

Although a preferred embodiment of this invention has been shown and described herein, inasmuch as this invention is subject to many variations and modifications of parts, it is intended that all matter contained in the above description of the embodiment shown and described shall be interpreted as illustrative and not in a limiting sense.

I claim:

1. In a control device, the combination comprising a pair of lever members, control means movable between control positions and operably engaged by one of said lever members, thermal means engaging another of said lever members for moving the same in a direction toward and away from the one of said lever members in response to temperature variations, a rotatable and translatable means disposed between said one and said other lever members in operative engagement therewith, supporting same in a spaced relationship, and for causing said one lever member to move said control means between control positions in response to movement of said other lever member, manual means operatively connected to said rotatable and translatable means for rotating the same to vary the spaced relationship of said pair of lever members to thereby vary the temperature at which said control means will be moved to said one control position, and pivotal means operatively connected to said rotatable and translatable means for causing translation thereof to vary the temperature differential of said control means between said one control position and said other control position.

2. In a control device, the combination comprising a pair of lever members, control means movable between control positions operably engaged by one of said lever members, thermal means engaging another of said lever members for moving same in a direction toward and away from the one of said lever members in response to temperature variations, an eccentric cam disposed between said one and said other lever members in operative engagement therewith supporting same in a spaced relationship and for causing said one lever member to move said control means between control positions in response to movement of said other lever member, manual means for rotating said eccentric cam to vary the spaced relationship of said pair of lever members to thereby vary the temperature at which said control means will be moved to one of said control positions, and pivotal means for moving said eccentric cam between said pair of lever members longitudinal of their length to vary the temperature differential of said control means between said one control position and another of said control positions.

3. In a control device, the combination comprising a base member, control means operable between an active and an inactive position supported on said base member, a first lever member with one end pivoted on said base member and having the other end movable in a manner to operate said control means, a second lever member disposed in a position to underlie said first lever member with one end pivoted on said base member and having the other end thereof movable toward and away from said first lever member, an eccentric cam member disposed between said first lever member and said second lever member intermediate the pivoted ends thereof engaging same to hold same in a spaced relationship and movable by said second lever member to cause movement of said first lever member to operate said control means, thermal means including a shaft member operably engaging said second lever member for causing movement thereof in response to temperature variations, a first manual means engaging said eccentric cam member in an operative manner for rotating same to adjust the spacing between said first and second lever members to thereby adjust the temperature at which said control means is moved to the active position, and second manual means engaging said eccentric cam member in an operative manner for moving same to a plurality of positions between said first and said second lever members intermediate their pivoted ends to thereby adjust the temperature differential of said control means between said active and said inactive positions.

4. In a control device, the combination comprising a base member, plural control means operable between an active and an inactive position supported on said base member, a first lever member pivoted by one end on said base member and having the other end movable in a manner to operate one of said control means, a second lever member disposed in a position to underlie said first lever member and pivoted by one end on said base member and having the other end thereof movable toward and away from said first lever member, an eccentric cam member disposed between said first lever member and said second lever member intermediate the pivoted ends thereof engaging same to hold same in a spaced relationship and movable by said second lever member to cause movement of said first lever member to operate said control means, a third lever member for operating another of said control means, thermal means including a shaft member operatively engaging said second and said third lever members for causing movement thereof in response to temperature variations, a first manual means engaging said eccentric cam member in an operative manner for rotating same to adjust the spacing between said first and said second lever members thereby adjusting the temperature at which said one control means is operated to said active position, and second manual means engaging said eccentric cam in a manner for moving same to a plurality of positions between said first and said second lever members intermediate their pivoted ends to thereby adjust the temperature differential of said one control means between said active and said inactive positions, and a third manual means engaging said third lever member for adjusting the temperature at which said other control means will be operated to its active position.

5. In a control device, the combination comprising a base member, control means mounted on said base member, condition responsive means mounted on said base member and operable in response to condition variations, motion transmitting means including a pair of lever means operably interposed between said control means and said condition responsive means to cause operation of said control means in response to said condition variations, and adjustable means for adjusting said pair of lever means, said adjsutable means including an elongated cam element operably positioned between said pair of lever means for adjustable movement thereof, said elongated cam element being rotatable about its longitudinal axis for moving said pair of lever means whereby the operation of said control means is adjusted and being capable of pivotal movement in a lateral direction relative to said pair of lever means for moving said pair of lever means whereby the operating differential of said control means is adjusted.

6. In a control device, the combination comprising a base member, control means mounted on said base member, condition responsive means mounted on said base member and operable in response to condition variations, motion transmitting means including a pair of levers operably interposed between said control means and said condition responsive means to cause operation of said control means in response to said condition variations, and adjusting means for said levers, said adjusting means including a cam element rotatably and pivotally mounted on said base member and operably interposed between said levers for adjustable movement thereof, said cam element being rotatable for moving said levers whereby the operation of said control means is adjusted and being laterally movable relative to said levers whereby the operating differential of said control means is adjusted.

7. In a condition responsive control device comprising a frame, a condition responsive member mounted upon said frame for movement relative to said frame in responsive to variations in a control condition, and a control member mounted for controlling movement on said frame; means for transmitting motion of said condition responsive member to said control member to drive said control member in condition responsive controlling movement comprising a pair of elongate levers mounted on said frame for pivotal movement about a pair of spaced parallel axes with said levers longitudinally overlapping each other, one of said levers being engaged by said condition responsive member to pivot about its axis in response to movement of said condition responsive member relative to said frame, the other of said levers being engageable with said control member to drive said control member in controlling movement upon pivotal movement of said other of said levers, a bracket mounted upon said frame interposed between said levers in engagement with both of said levers for adjustably positioning said other of said levers relative to said one of said levers and for transmitting pivotal movement of said one of said levers to said other of said levers, a bracket mounted upon said frame for pivotal movement about an axis perpendicular to the plane containing said pair of parallel axes, an elongate adjusting member mounted in said bracket for rotative adjustment about an axis normal to said first axis and for movement relative to said bracket in a direction parallel to said first axis, said adjusting member projecting from said bracket toward said levers, and means mounting said cam means upon said adjusting member for movement therewith longitudinally of said levers to adjustably vary the amount of controlling movement of said control member induced by a given amount of movement of said condition responsive member.

References Cited in the file of this patent

UNITED STATES PATENTS

| | | |
|---|---|---|
| 406,152 | Sturtevant | July 2, 1889 |
| 1,449,005 | Hoyt | Mar. 20, 1923 |
| 2,055,280 | Dodson | Sept. 22, 1936 |

FOREIGN PATENTS

| | | |
|---|---|---|
| 887,030 | France | July 26, 1943 |
| 893,844 | France | Feb. 28, 1944 |

UNITED STATES PATENT OFFICE
CERTIFICATE OF CORRECTION

Patent No. 3,044,295                  July 17, 1962

Paul Franklin Shivers

It is hereby certified that error appears in the above numbered patent requiring correction and that the said Letters Patent should read as corrected below.

Column 8, line 58, for "adjsutable" read -- adjustable --; column 9, line 12, for "responsive" read -- response --; line 26, for ", a bracket mounted upon said frame" read -- about its axis, adjustable cam means --.

Signed and sealed this 30th day of October 1962.

(SEAL)
Attest:

ERNEST W. SWIDER
Attesting Officer

DAVID L. LADD
Commissioner of Patents